United States Patent [19]
Sundet

[11] 4,029,718
[45] June 14, 1977

[54] PIVALOLACTONE RANDOM GRAFT COPOLYMERS

[75] Inventor: Sherman A. Sundet, Wilmington, Del.

[73] Assignee: E. I. Du Pont de Nemours and Company, Wilmington, Del.

[22] Filed: May 20, 1975

[21] Appl. No.: 579,362

Related U.S. Application Data

[60] Division of Ser. No. 268,056, June 30, 1972, Pat. No. 3,897,513, which is a continuation-in-part of Ser. No. 166,281, July 26, 1971, abandoned.

[52] U.S. Cl. .................... 260/877; 260/874; 260/875; 260/878 R; 260/879; 260/880 R; 260/880 B

[51] Int. Cl.$^2$ ........................ C08L 51/04

[58] Field of Search .......... 260/879, 887, 878, 880, 260/874, 875, 877

[56] References Cited

UNITED STATES PATENTS

| | | | |
|---|---|---|---|
| 3,800,006 | 3/1974 | Katayama et al. | 260/887 |
| 3,897,513 | 7/1975 | Sundet | 260/887 |

Primary Examiner—J. Ziegler

[57] ABSTRACT

Disclosed herein are random graft copolymer compositions comprising base polymers that are amorphous to x-rays at a temperature of 130° C or below, to which base polymer is randomly grafted, on the average, at least one sidechain of crystallizable homopolymers of α-substituted-β-propiolactones and/or copolymers thereof; a process for making said random graft compositions; and use thereof, inter alia, as molded or extruded articles.

17 Claims, No Drawings

PIVALOLACTONE RANDOM GRAFT COPOLYMERS

CROSS REFERENCE TO RELATED APPLICATION

This is a division of copending application Ser. No. 268,056, filed June 30, 1972, now U.S. Pat. No. 3,897,513, which in turn is a continuation-in-part of application Ser. No. 166,281, filed July 26, 1971, now abandoned.

BACKGROUND AND SUMMARY OF THE INVENTION

This invention relates to novel random graft copolymers in which homopolymers of α-substituted-β-propiolactones and/or copolymers thereof are randomly grafted to base polymers which are amorphous to x-rays at a temperature of 130° C or below.

The random graft copolymers described herein are formed by contacting an amorphous base polymer having, on the average, at least one random anionic site thereon, with up to 150% by weight, based on the base polymer, of at least one α-substituted β-propiolactone in an amount such that the ratio of the moles of β-lactone to the moles of anionic sites on the base polymer varies between about 3 to 1000, and polymerizing said β-lactone to form crystallizable polymer sidechains, said sidechains having a length of between about 3 to 1000 monomer units and a weight of up to about 60 percent of the graft composition, said base polymer characterized in that it is amorphous to x-rays at a temperature of 130° C or below, and has a molecular weight of above about 2,000.

As employed herein, the expression "random graft copolymer" refers to a composition consisting essentially of base polymer having an average of one or more polylactone sidechains randomly grafted thereto, there being no particular order in the location on the base polymer molecule of said grafted sidechains. Whereas conventional block copolymers of the simple ABA and ABC type have A and/or C segments characteristically attached at the ends of the backbone chain, B, the novel random graft copolymers show no such characteristic order or pattern. In fact, any amounts of such simple ABA and/or ABC type copolymer which might be present along with the novel random graft copolymer would be statistically negligible. However, the random graft copolymer can have a portion of its polylactone content (other than in at least one randomly located sidechain) attached at either or both ends of the backbone chain, since the amorphous base polymer chain can have anionic graftsites at either or both ends.

The term polymer(s) used herein refers to organic homopolymer(s) and/or copolymer(s), including terpolymer(s), etc., depending upon the context in which the term is employed.

The term "consisting essentially of " as used herein means that materials so described may include unspecified minor ingredients which do not materially affect the basic and novel characteristics of the invention. In other words, this term excludes unspecified ingredients in amounts which prevent the novel characteristics of this invention from being realized The expression "base polymer" as employed herein encompasses polymers that contain at least one randomly located anionic site thereon. If a polymer contemplated to be used as a base polymer does not have the requisite random anionic site(s), then, said polymer must be susceptible to treatment as disclosed in the section, "Process for Making the Graft Compositions," in order to have said random site(s) formed thereon.

The base polymers employed herein can be solids or viscous liquids at ambient temperatures. The "amorphous" base polymers useful herein are those that are normally amorphous to x-rays at a temperature of 130° C or at some temperature below 130° C. The expression "amorphous" also includes the characteristic that said base polymers soften or melt at 130° C or below. The base polymers will show amorphous type patterns in x-ray diffractograms at and above the lowest temperature at which said polymer contains amorphous segments.

The average molecular weights of the base polymers are from about 2,000 to about 10,000,000. The lower limit is a number average molecular weight as measured by vapor phase osmometry. The upper limit is a weight average molecular weight as measured by light scattering or viscosity. Regarding light scattering measurements, see, for example, "Physical Methods of Organic Chemistry" Part 3, Chapter XXXII, pages 2107–2145, Interscience Publications, Inc., N.Y. (1960).

It should be understood that the numbers employed herein to describe the novel random graft copolymers represent average values. The normal distribution of molecular weights, comonomers, functionality, etc., in a polymer composed as it is of long chain molecules of varying lengths makes such usage necessary and conventional. For instance, numbers given for the following graft copolymer characteristics represent averages of values: molecular weights of base polymers, numbers of sidechains per base polymer molecule, and degree of polymerization (DP) of the crystallizable sidechains.

Pivalolactone as used herein is the common name for the lactone of 2,2-dimethyl-3-hydroxypropanoic acid. The term crystalline or crystallizable as applied to the contemplated polylactones means that they can develop crystalline domains with or without drawing and/or annealing to form crystalline polymer. One method for detecting crystallinity is by examination of thin sections of the polymer through crossed polarizing filters under a microscope. Under such examination, crystallinity can usually be observed by the appearance of spherulites. Alternatively, crystallinity can be detected by differential scanning calorimetry, wherein the appearance of a melting endotherm is taken as an indication of the presence of crystalline structure. Extremely small crystalline domains are detectable by transmission electron microscopy using appropriate staining techniques. For a discussion of differential scanning calorimetry, see "Organic Analysis", Vol. IV, pp. 361–393, Interscience Publishers Inc. (1960).

The desirable sidechain length will depend in part on the degree of crystallinity of the polymer or copolymer of the particular β-lactones or β-lactones being used. Pivalolactone polymerizes to polymers that are highly crystalline. Other operable β-lactones give polymers with relatively lower degrees of crystallinity. In general, the lower the degree of crystallinity of a side chain, the higher the DP thereof that will be desired to realize a given physical characteristic.

The novel graft copolymers taught herein have unusually good and surprising properties which may be attributed to the strong tendency of grafted polypivalolactone segments to crystallize one with another. As a result of this strong tendency, base polymer molecules which bear the grafted polyester are, in effect, bound together at the point where polyester segments crystallize. Where more than two polyester graft segments exist per chain, there is therefore possible the reversible formation of a three-dimensional network, much as in conventional (irreversible) vulcanization of natural rubber and synthetic elastomers. As a result, the graft polymers of this invention have unusually good resistance to creep and compression set, which may be defined as resistance to permanent deformation.

In addition, certain of the compositions of this invention, without curing, exhibits high elastic recovery, high tensile strength at break and high elongation at break, fully equivalent to those of conventionally vulcanized (cured) rubbery materials. Moreover, certain of these compositions show high tensile strength and modulus values unattainable by conventional curing of the corresponding base polymers by standard techniques without the addition of reinforcing fillers such as activated carbon black. The crystallized graft segments provide "internal reinforcement" and thus it may be unnecessary to undergo expensive bulk mixing of a foreign reinforcing agent, such as carbon black, to achieve high tensile strength and modulus properties.

The novel copolymers of this invention are strong form-stable materials at ordinary service temperature; they are viscous liquids above the melting points of the grafted polyesters segments and can be processed as thermoplastic materials Thus, they can be formed into useful articles by conventional techniques such as compression and injection molding and the like at temperatures above the graft polymer melting point. On cooling, new network formation occurs by virtue of the crystallization of graft chains, as previously discussed, and the composition takes the shape of the mold cavity. This change from solid to liquid and back can be repeated several times without damage to the copolymer, making possible reuse of mold flashings and reject articles and the like. Short time cycles can be employed as opposed to more lengthy periods often required for conventional curing.

The graft copolymers of this invention also exhibit improved resistance to high temperature deformations when compared to the base polymer. The deformation temperatures of the graft copolymers are higher than the deformation temperatures of the corresponding base polymers. Thus, the temperature range of practical use of the base polymer is extended. Also, service life at a given temperature is improved because of the pervasive resistance to creep and to compression set. Solvent resistances of the novel graft copolymers are markedly better than those of the corresponding base polymers.

The chemical and physical properties of the graft copolymers can be varied over a wide spectrum by careful selection of the base polymer. For example, base polymers containing halogen or polar substituents give products with high resistance to hydrocarbon oils. Saturated hydrocarbon base polymers such as those obtained by copolymerization of simple olefins by coordination catalysts (ethylene-propylene-butylene, etc.) can be expected to provide high resistance to ozone and oxygen attack. Base polymer structures similar to natural rubber, e.g., 1,4-cis-polyisoprene, provide highly resilient copolymer products.

DETAILS OF THE INVENTION

The random graft copolymers described herein consist essentially of base polymers having randomly grafted thereto at least one crystallizable polymer sidechain selected from homopolymer(s) and copolymer(s) of $\alpha$-substituted $\beta$-propiolactones, said compositions characterized in that the base polymers are amorphous to x-rays at a temperature of 130° C or below, the molecular weight of the base polymer is in the range of about 2,000 to 10,000,000, each sidechain varies in length between about 3 to 1,000 monomer units (degree or polymerization, DP, of about 3 to 1,000), preferably between about 5 to 75 monomer units, (DP of 5 to 75), and the total weight of the crystallizable polymer does not exceed about 60 percent of the entire weight of the graft composition, that is, the weight of the crystallizable polymer is up to 150% of the weight of the base polymer.

This invention encompasses more than graft copolymers of pivalolactone and/or its homologs with the particular polymers, copolymers and terpolymers listed below. Rather, this invention encompasses graft copolymers of crystallizable polylactones and base polymers having the required properties discussed herein.

Base Polymer

A prerequisite of the base polymer is that it contain anionic reaction sites thereon. The reaction sites can be carbanions or oxy-group anions. Carbanionic reaction sites are selected from allylic, benzylic and aromatic carbanions. Oxy-group reaction sites are selected from carboxylic and alkoxide anions. The carboxylic anion is $\equiv COO^-$ (deriving from $\equiv COOH$) and the alkoxide anion is $CO^-$ (deriving from $COH$, i.e., from a hydroxylic group). Base polymer candidates not having the requisite anionic reaction sites as part of their structure must be capable of developing such sites. For instance, base polymers can have free carboxylic sites or carboxylic sites that are developable by a procedure such as will be discussed hereinafter. Representative base polymers include:

A. Base Polymers with Carbanionic Sites polyalkadienes such as polyisoprene and polybutadiene
vinyl aromatic/alkadiene copolymers such as styrene/butadiene, $\alpha$-methylstyrene/butadiene and vinylfluorene/butadiene copolymers
styrene/butadiene/styrene ABA block copolymer
ethylene/propylene/nonconjugated diene terpolymers made from dienes such as 1,4-hexadiene, methylenenorbornene, ethylidenenorbornene, propenylnorbornene and dicyclopentadiene
branched chain ethylene/propylene/nonconjugated diene tetrapolymers made with combinations of dienes such as 1,4-hexadiene/norbornadiene and 1,4-hexadiene/1,7-octadiene
poly-N-vinylcarbazole B. Base Polymers with Free Carboxylic Sites butadiene/acrylic acid copolymer
chloroprene (2-chloro-1,3-butadiene)/methacrylic acid copolymer
ethylene/methacrylic acid copolymer ethylene/propylene/nonconjugated diene (e.g., 1,4-hexadiene) terpolymer, reacted with mercaptoacetic acid
chlorinated ethylene/methacrylic acid copolymers, especially those containing 10–40% chlorine by weight
ethyl acrylate/acrylic acid copolymer
methyl methacrylate/methacrylic acid copolymer
methyl methacrylate/ethyl acrylate/methacrylic acid terpolymer
methyl methacrylate/n-butyl methacrylate/methacrylic acid terpolymer
ethyl acrylate/methyl methacrylate/itaconic acid terpolymer
acrylate ester/acrylic acid/methacrylic acid terpolymers wherein the acrylate ester has 4–15 carbons, especially ethyl acrylate/acrylic acid/methacrylic acid terpolymers
ethylene/methyl acrylate/ethyl hydrogen maleate terpolymer
ethylene/ethyl acrylate/methyl hydrogen maleate terpolymer
ethylene/methyl methacrylate/ethyl hydrogen maleate terpolymer
ethylene/acrylonitrile/methyl hydrogen maleate terpolymer
ethylene/methyl acrylate/methacrylic acid terpolymer
ethylene/ethyl acrylate/methacrylic acid terpolymer
ethylene/ethyl acrylate/acrylic acid terpolymer
ethylene/isobutyl acrylate/methacrylic acid terpolymer
ethylene/methyl methacrylate/acrylic acid terpolymer
ethylene/vinyl acetate/acrylic acid terpolymer
ethylene/vinyl acetate/methacrylic acid terpolymer
ethylene/acrylonitrile/methacrylic acid terpolymer
ethylene/propylene/nonconjugated diene polymer partially ozonized to give random carboxylic acid groups
silicone polymers such as polydimethylsiloxanes bearing pendant carboxyl groups C. Base Copolymers with Developable Carboxylic Sites ethylene/propylene/nonconjugated diene polymer reacted with at least one of maleic anhydride and ethyl mercaptoacetate
styrene/maleic anhydride copolymer
ethylene/ethyl acrylate copolymer
ethylene/methyl methacrylate copolymer
ethylene/dimethylaminoethyl methacrylate copolymer
poly(ethyl acrylate)
poly(butyl acrylate)
ethyl acrylate/butyl acrylate copolymer
methyl methacrylate/ethyl acrylate copolymer
methyl methacrylate/dimethylaminoethyl methacrylate copolymer
alkyl vinyl ether/maleic anhydride copolymer, e.g., methyl vinyl ether/maleic anhydride copolymer
ethylene/ethyl acrylate/maleic anhydride terpolymer
silicone polymers such as polydimethylsiloxanes bearing pendant carbethoxyl groups D. Base Polymer with Hydroxylic Sites ethylene/vinyl acetate copolymer
ethylene/allyl acetate copolymer
ethylene/2-methyl-2-propenyl acetate copolymer
ethylene/alkoxyalkylvinyl ether copolymers made from vinyl ethers such as 2-hydroxyethyl vinyl ether, 2-hydroxypropyl vinyl ether, 4-hydroxybutyl vinyl ether and 6-hydroxyhexyl vinyl ether.

Of the representative base polymers set out above, those are preferred that are characterized by having glass transition temperatures, $T_g$, below 130° C. as determined by differential scanning calorimetry. $T_g$ indicates second-order transition with relaxation of amorphous chain segments. More preferred base polymer compositions have glass transition temperatures at room temperature or lower, especially at 0° C or below, and most especially at −40° C or below.

A preferred class of base polymers are acrylic interpolymers consisting essentially of about 50 to 99.95 percent by weight of acrylic ester selected from the group consisting of aliphatic and alicyclic acrylates having from 4 to 16 carbon atoms and aliphatic and alicyclic methacrylates having from 5 to 16 carbon atoms, about 0 to 40 percent by weight of ethylenically unsaturated copolymerizable monomer selected from the group consisting of styrene, vinyl acetate, vinyl fluoride, vinyl chloride, vinylidene fluoride and vinylidene chloride, and about 0.05 to 10 percent by weight of ethylenically unsaturated organic acid. Suitable acrylic esters include the methyl, ethyl, isobutyl, cyclohexyl, 2-ethylhexyl and dodecyl esters of acrylic and methacrylic acids and the like. Suitable ethylenically unsaturated acids include acrylic acid, methacrylic acid, maleic acid, methyl hydrogen maleate, ethyl hydrogen maleate, itaconic acids, and the like. A particularly preferred acrylic interpolymer consists essentially of about 95 to 99.9 percent by weight of acrylic ester selected from the group consisting of aliphatic and alicyclic acrylate esters having from 4 to 11 carbon atoms and aliphatic and alicyclic methacrylate esters having from 5 to 12 carbon atoms, and about 0.1 to 5 percent by weight of acid selected from the group consisting of acrylic acid and methacrylic acid.

Another preferred class of base polymers includes ethylene/acrylic ester/acid terpolymers consisting essentially of about 1 to 98.95 percent by weight of ethylene, about 1 to 98.95 percent by weight of acrylic ester selected from the group consisting of aliphatic and alicyclic acrylate esters having from 4 to 16 carbon atoms and aliphatic and alicyclic methacrylate esters having from 5 to 16 carbon atoms, and about 0.05 to 10 percent by weight of ethylenically unsaturated organic acid. A particularly preferred terpolymer consists essentially of about 50 to 90 percent by weight of ethylene, about 10 to 49.9 percent by weight of acrylic ester selected from the group consisting of aliphatic and alicyclic acrylate esters having from 4 to 11 carbon atoms and aliphatic and alicyclic methacrylate esters having from 5 to 12 carbon atoms, and about 0.1 to 5 percent by weight of acid selected from the group consisting of acrylic acid, methacrylic acid, and ethyl hydrogen maleate.

Another preferred class of base polymers includes interpolymers consisting essentially of about 0 to 99.95 percent by weight of ethylene, about 0 to 99.95 percent by weight of vinyl ester of saturated aliphatic carboxylic acid of 1 to 6 carbon atoms, and about 0.05 to 10 percent by weight of ethylenically unsaturated organic acid. Suitable vinyl esters include vinyl acetate, vinyl propionate, vinyl butyrate, vinyl trimethylacetate, and the like. A particularly preferred terpolymer consists essentially of about 50 to 90 percent by weight of ethylene, about 10 to 49.9 percent by weight of vinyl acetate and about 0.1 to 5 percent by weight of acid selected from the group consisting of acrylic acid and methacrylic acid.

The Sidechains

Polypivalolactone, condensation polymer from 2,2-dimethyl-3-hydroxypropanoic acid, is the preferred sidechain. Other crystallizable polylactones, however, are also operable to produce the novel graft copolymer compositions. Operable polylactones include those derived from the homologs of pivalolactone as well as copolymers thereof with each other and/or pivalolactone. The lactones include α-substituted-β-propiolactones and α,α-disubstituted-β-propiolactones. Said β-propiolactones can have hydrocarbon and/or nonhydrocarbon substituents. The α-substituents on the operable disubstituted homologs may be the same or different. The preferred homologs have identical substituents.

Operable β-lactones include the following as well as copolymers thereof;

α,α-dimethyl-β-propiolactone (pivalolactone)
α, α-diethyl-β-propiolactone
α, α-dibutyl-β-propiolactone
α, α-bis(chloromethyl)-β-propiolactone
α,α(chloroethyl)-β-propiolactone
α,α-tetramethylene-β-propiolactone
α,α-pentamethylene-β-propiolactone
α-methyl-β-propiolactone
α-ethyl-β-propiolactone
α-methyl-α-chloromethyl-β-propiolactone
α-ethyl-α-isopropyl-β-propiolactone
α-ethyl-α-isopentyl-β-propiolactone
α-n-butyl-α-ethyl-β-propiolactone
α-(bromomethyl)-α-methyl-β-propiolactone
α-methyl-α-phenyl-β-propiolactone
α-benzyl-α-methyl-β-propiolactone
α-phenyl-β-propiolactone
α,α-diphenyl-β-propiolactone
α,α-bis(4-methylphenyl)-β-propiolactone, and
α,α-bis(4-chlorophenyl)-β-propiolactone.

Process for Making the Graft Compositions

The novel process of this invention comprises polymerizing at least one α-substituted-β-propiolactone in the presence of an amorphous base polymer having at least one random anionic site thereon, thereby randomly grafting crystallizable polylactone sidechains from each anionic site on the base polymer molecule. The amorphous base polymer may possess, along with at least one randomly located anionic site, additional anionic sites at either or both ends of the backbone chain.

If a polymer to be used as a base polymer does not have the requisite random anionic sites capable of initiating graft copolymerization, then, said polymer must be treated to form said random sites. If the polymer does have the required sites, it can be utilized as a base polymer and reacted with the β-lactone monomer without further treatment.

Formation of the Anionically Substituted Base Polymer

The ring-opening polymerization of the operable β-lactone proceeds by an anionic reaction mechanism. Thus, the base polymer must have anionic reaction sites thereon for initiating sidechain polymerization therefrom.

Formation of an anionically substituted base polymer can be accomplished in a suitable solvent medium or in bulk. The specific steps and stages depend upon the characteristics of the particular polymer involved as will be discussed hereafter.

Base polymer candidates include those that have potential carbanionic, carboxylic or hydroxylic anionic reaction sites. Contemplated polymers having potential carbanionic reaction sites include those with allylic, benzylic or aromatic carbons derived from 1,3-alkadiene and vinyl substituted aromatic monomers. Base polymers having substituent carboxylic reaction sites are available by well known polymerization methods in which carboxylic acid-containing monomers such as methacrylic acid or maleic acid or fumaric acid or easily hydrolyzable derivatives of carboxylic acids such as esters, for example, ethyl acrylate; anhydrides, for example, maleic anhydride; and amides, for example, methacrylamide are components of the system. Base polymers having substituent hydroxylic reaction sites are available by well known polymerization methods in which monomeric olefinic alcohols such as allyl alcohol or easily hydrolyzable derivatives of olefinic alcohols such as esters, for example, vinyl acetate and allyl acetate, are components of the system.

Carbanions by Lithiation

The potential carbanionic sites of a 1,3-polydiene-or styrene-containing polymer can be lithiated by highly active alkyllithium-diamine complexes such as butyllithium-N,N,N',N'-tetramethylethylenediamine complex (First Akron Summit Polymer Conference-Symposium on Anionic Polymerization, June, 1970, Abstract; Langer, p.20; Heller, p.33. Coates et al., Organometallic Compounds, Vol. 1, pp. 18–20, 35, 60, Methuen & Co. Ltd., 1967). In these lithiating reactions the lithium atoms do not generate more than one active anionic site each. Accordingly, the average number of activated carbanionic sites per molecule of substrate polymer depends upon the molecular weight of the polymer and the amount of lithiating agent used.

Because of their high activity, lower alkyllithiumdiamine complexes are preferred lithiating agents. Representative lower alkyllithiums are the primary, secondary and tertiary alkyl and cycloalkyl lithiums of 1 to 7 carbon atoms including methyllithium, ethyllithium, n-butyllithium, s-butyllithium and cyclohexyllithium. Aralkyllithiums such as benzyllithium can sometimes also be used. Preferred diamines for alkyllithiumdiamine complexes are N,N,N',N'-tetramethylethylenediamine and similar diamines having lower alkyl groups other than methyl also can be used, e.g., N,N,N',N'-tetrabutylethylenediamine. Representative ethers for use in alkyllithium-ether complexes are tetrahydrofuran, dioxane, ethylene glycol dimethyl ether and tetraethylene oxide dimethyl ether (tetraglyme), the last being a most preferred ether.

Formation of carbanions by lithiation is a moderately rapid reaction usually carried out between about 25° to 50° C. although lower or higher temperatures may be employed if desired. This step is usually staged in about an hour although sometimes over a period of 2 to 4 hours, even though the inherent rate of reaction will ordinarily accomplish the reaction in substantially less time. Longer reaction periods fail to yield products with significantly improved properties. Alkyllithiums complexed with diamines or ethers can react intramolecularly by proton abstraction and subsequent lithiation of carbons in the diamines or ethers. Accordingly, in using these agents it is desirable to minimize these side reactions by not prolonging the reaction time.

In the lithiation reaction the order of mixing the polymer, the hydrocarbyllithium, and the complexing agent (diamine or ether) is not critical. Premixing the hydrocarbyllithium and the complexing agent before contact with the polymer is believed, however, to reduce undesirable formation of metalated clusters and high local concentrations of metalating agent.

Carboxyl Anion

In a carboxyl-substituted base polymer, the carboxyl groups become useful anionic sites upon simple neutralization with an appropriate base. When the carboxyl function is present as an ester, an amide, or an anhydride, the reaction with the base involves saponification to form the carboxylate anion. In this case, as in that of lithiated carbanionic sites, the number of anionic sites depends on the number of moles of potential sites available and the number of moles of the base used. When the carboxyl group is present as the free acid, all of the individual carboxyl groups on the substrate can become anionic reaction sites through chain transfer. The number of such sites can therefore be an intrinsic value of the carboxylated substrate and is not necessarily determined by the amount of base used.

Preferred bases are those with cations such as the quaternary ammonium cations or complexed alkali metal cations. Examples of suitable quaternary ammonium bases are tetramethylammonium hydroxide
tetraethylammonium hydroxide
tetra-n-butylammonium hydroxide
benzyltrimethylammonium methoxide
dodecyltrimethylammonium hydroxide.

Preferred complexed alkali metal cations are tetramethylethylenediaminelithium, and (tetraethylene glycol dimethyl ether)lithium. Other operable, but less preferred complexing ligands for the lithium ion are tetrahydrofuran and ethylene glycol dimethyl ether. A convenient source of an ether-type complexing agent is an excess of the particular ether used as a solvent for the reaction. As will be appreciated by those skilled in the art, the preference for particular complex cations will depend upon the thermal stability thereof and the temperature at which they are employed.

Suitable base polymers having substituent carboxylic sites include vinyl copolymers containing comonomers such as acrylic acid, acrylic esters, methacrylic acid, maleic anhydride, itaconic acid, itaconic esters and the like. Representative carboxyl-substituted polymers having readily neutralized carboxylic substituents include chlorinated ethylene/methacrylic acid copolymer, ethyl acrylate/methyl methacrylate/itaconic acid terpolymer, ethylene/vinyl acetate/methacrylic acid terpolymer, maleic anhydride adduct of ethylene/propylene/1,4-hexadiene terpolymer and the like.

Base polymer candidates having no substituent carboxyl groups can often be provided with carboxylic reaction sites by various means. For example, carboxylation of a polymer having —C=C—groups can be accomplished by free radical-initiated addition of thioglycolic acid or an ester thereof to such double bonds (cf, Example 4, part A. Alternatively, carboxylation of a polymer can be accomplished by thermal grafting thereto of, for instance, maleic anhydride; or, by ozone treatment of available sidechain ethylenic unsaturation. Carboxylation of a metallated polymer, such as lithiated polybutadiene, can be accomplished by carbonation with carbon dioxide [cf, Tate et al., J. Poly Sci Part A-1, 9,139 (1971); Minoura et al., J. Poly Sci. Part A-1, 6, 559 (1968)]. Suitable carboxylated polymeric substrates include carboxylated ethylene/propylene/diene terpolymers, carboxylated polybutadiene, carboxylated polyisoprene, carboxylated styrene homo- and copolymers and the like.

Graft Polymerization at the Anionic Sites

The random graft copolymers of this invention are formed by reacting the base polymer with up to about 150% by weight of the base polymer of an α-substituted β-propiolactone. A reaction of the base polymers and β-lactones in that amount will yield graft copolymers having sidechains forming up to about 60% of the weight of the entire graft copolymer composition. It is most preferred to react the base polymers with from about 5 to 70% by weight of the base polymer of the β-lactone to produce grafts having a good balance of properties.

Where the anionic sites of the base polymers are oxygroups (carboxylate, alkoxide) the base polymer should contain at least about 0.02 to 1 mole of said oxy-groups per kilogram and preferably from 0.04 to 0.5 moles per kilogram of base polymer to give graft copolymers displaying the best properties. The term anionic oxy-groups means carbonyloxy (—COO⁻) or oxy (—O⁻) groups. Carbonyloxy ions can be measured by titration to neutrality with a strong acid such as HCl. The moles of mono protic acid necessary to neutralize the carbonyloxy groups in one kilogram of polymer is the moles/kg. of "anionic oxygroups." Similarly, oxygroups can be titrated with strong acid to yield moles/kg. "anionic oxy-groups."

The graft polymerization involves an anion-initiated ring-opening polymerization of a β-lactone to form the corresponding polyester, the anionic initiating site being localized on the base polymer. Since the polymerization reaction of the lactone involves attachment of succeeding lactone units to the growing anionic sidechain, each separate anionic site can lead to a separate polyester chain. The reaction of an anionically polymerizable β-lactone with a backbone polymer containing randomly positioned anionic reaction sites is illustrated by the equation

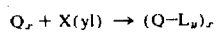

wherein Q is the average base polymer segment, and L is the β-lactone unit. $L_y$ is therefore the grafted sidechain with an average degree of polymerization (DP) of $y$. The value of $y$ is equal to the moles of monomeric lactone employed divided by the total moles of anionic grafting sites, and is thus equal to the moles of lactone used per mole of base polymer segment. The term $x$ is the average number of initiating sites per base polymer molecule, so that the average base polymer molecule is designated as $Q_x$.

In products with base polymers where the number of anionic sites depends on the amount of base used, (i.e., base polymers that have lithiated carbanionic sites or alkali base-neutralized carboxylic sites generated by saponification of carboxylic ester groups), $x$ is equal to the number of equivalents of alkali base per mole of base polymer. In products obtained with base polymers having free carboxyl groups, where the number of active carboxylic anionic sites does not depend on the amount of base used, $x$ is equal to the number of moles of free carboxyl groups per mole of base polymer. Accordingly, the number average molecular weight of the base polymer is equal to $x$ times the number average molecular weight of the average base chain segment Q.

The relationship of the crystalline sidechains to the base polymer can also be conveniently described in terms of "hard segment values" and "soft segment values." See, for instance, Examples 4, 6, 8 and 9 wherein various hard and soft segment values are set out. The term hard segment value as employed herein corresponds to $L_y$, the grafted sidechain with average DP of $y$. It is an average value and is the molecular weight of the monomeric lactone multiplied by the number of moles of lactone present in the grafting reaction, divided by the total moles of anionic sites. The term soft segment value corresponds to Q, the average base polymer segment. It is an average value and is the weight of the base polymer in grams, per mole of anionic sites on said base polymer. It is to be understood that these relationships do not necessarily exactly define the structure of the resultant graft polymer since they merely conveniently relate ratios of reacting materials.

In terms of the formula, $(Q-L_y)_x$, set out above, where Q and $L_y$ are defined in terms of their numerical values, the hard segment value is $L_y$ and the soft segment value is Q. In the case of polypivalolactone sidechains, L = 100.

Any of the graft polymerizations taught herein can be carried out conveniently in a solvent. Operable reaction temperatures are between about $-80°$ to $200°$ C. with preferred temperatures of $20°$ to $120°$ C. A wide variety of solvents can be employed depending upon the method by which the initiator site is prepared and the solubility of the base polymer. If the anionic site is an anionic carboxylate group, solvents can be employed which do not contain active hydrogen and do not react with the base employed to form the anionic group. Representative solvents include one or more of aliphatic, cycloaliphatic and aromatic hydrocarbons (hexane, cyclohexane, benzene, toluene), ethers (tetrahydrofuran, dioxane, ethylene glycol dimethyl ether, diethylene glycol dimethyl ether), ketones (acetone, methyl ethyl ketone, methyl isobutyl ketone), chlorinated hydrocarbons (chloroform, hexachloroethane, tetrachloroethylene), dimethyl formamide, dimethyl sulfoxide and the like.

The inert solvent that is conveniently used to dissolve the base polymer is frequently different from the solvent or solvents conveniently or advantageously used for the formation of carbanionic sites on said base polymer as prepared by reaction with alkyllithium, and different from the solvent employed in the reaction with the grafting agent. A few hydrocarbon polymers, such as, for example, cis 1,4-polybutadiene, are used as solutions in hydrocarbon solvents, such as hexane, heptane, and cyclohexane. Cyclic ethers such as tetrahydrofuran can be used for many base polymers such as carboxylated copolymers of 60 -olefins and nonconjugated dienes, ethylene/vinyl acetate copolymers, ethylene/alkyl acrylate, copolymers, acrylic ester homopolymers and copolymers. Alkyllithiums are normally kept in hydrocarbon solvents and are usable in such solvents. Methanol is a convenient solvent for tetraalkylammonium hydroxides, which in turn are sources of tetraalkylammonium cations for association with carboxylate anionic sites.

When the base polymer contains anhydride, carboxyl or carboxylate groups as potential anionic sites, the graft polymerization reaction can be carried out neat in the melt, for instance, in a melt extruder. Operable temperatures for carrying out graft polymerization reaction in the melt vary according to the minimum flow temperature and the decomposition temperature of the reactants. Generally, the temperatures are maintained between about $50°$ to $235°$ C. Preferred temperatures for ethylene/vinyl acetate/methacrylic (or acrylic) acid terpolymers are between about $100°$ to $150°$ C.

DESCRIPTION OF THE PREFERRED EMBODIMENTS

The following Examples are offered to illustrate but not to limit the invention. It should be noted that the product obtained in each of these Examples contains a significant proportion of the novel graft compositions particularly described herein. This is seen from the physical property improvements that are set out. Nothing contained in any of these Examples should be understood to say that all of the product consists of the novel graft compositions.

In Examples 4, 5, 6, 8–12, 14, 17–27, 29, 30, 33 and 36 one or more of these test methods were used:

|  | ASTM Method |
|---|---|
| Modulus at 100% extension | D 412–68 |
| Modulus at 300% extension | D 412–68 |
| Tensile strength at break | D 412–68 |
| Elongation at break | D 412–68 |
| Compression Set (22 hrs/70° C.) | D 395 (Method B) |
| Shore A hardness | D 2240–68 |
| Permanent Set at break | D 412–68 Section 5.5 modified by use of a 5-min. hold time) |
| Bashore Impact Resilience | D 2632–67 |

In the other Examples, stress-strain properties were determined on an Instron machine, TTC Model, equipped with a C cell and ¼-second recorder. Sample specification was ASTM D-1708, but specimens were pulled at 1 inch per minute with 1 inch per minute chart speed. When tested at $100°$ C., specimens were preheated for three minutes. Modulus, strength, yield- and break-associated terms are as defined in ASTM Section D-638. Melt index was determined by ASTM procedure D 1238-65T, Condition E. The minimum flow temperature, MFT, is defined as the temperature of onset of flow from the extrusion plastometer (ASTM D 1238-65T, Condition E) when the temperature is programmed upward at $1°$ C per minute. The number-average molecular weight, $M_n$, is as defined in "Textbook of Polymer Science" F.W. Billmeyer, Jr., Interscience Publishers, Div. John Wiley & Sons, New York, 1962, p. 56.

EXAMPLE 1

Polypivalolactone-on-Polyisoprene Graft

Polyisoprene, 200,000 $M_n$, having a high content of cis-1,4-structure was prepared with lithium-sodium alloy, 3.8 mol % sodium, as the polymerization initiator. The alloy is prepared by mixing lithium and sodium in mineral oil at 200° C. (or decalin at 192° C.) with a high speed stirrer. The mixture is then cooled rapidly with rapid agitation to form a fine dispersion. For further details concerning the initiator, see coassigned application Ser. No. 24,540, filed Apr. 1, 1970, now U.S. Pat. No. 3,673,776.

A sample of polyisoprene, 7.8 g (0.115 monomer mole) was dissolved in 300 ml of dry cyclohexane. To this was added 0.066 ml (5.5 × $10^{-4}$ mole) of N,N,N',-N'-tetramethylethylenediamine (TMEDA) followed by 0.5 ml of 1.5 molar in butyllithium (3.3 × $10^{-4}$ mole) in hexane. The reaction mixture immediately turned yellow and became very viscous. The mixture was heated to 50° C. and stirred at this temperature for one hour at which time the color was deep yellow-orange. Pivalolactone (PVL), 0.2 ml (about 2 × $10^{-3}$ mole), was then added. The yellow-orange color disappeared immediately on introduction of the PVL, and the viscosity increased so that stirring became very difficult.

Samples of the resulting graft polymer, removed at successive intervals of a few minutes each, were found by infrared analysis to contain the same level of grafted PVL, indicating that the reaction had been completed within the first few minutes. The reaction mixture was kept at room temperature overnight without stirring, and the graft product was then precipitated in an excess of ethanol containing a small amount of dissolved N-phenyl-$\beta$-naphthylamine as anti-oxidant. The precipitate, separated by filtration and dried under vacuum for two days, contained polypivalolactone-on-polyisoprene graft. IR indicated the reaction of PVL to be quantitative. The thermoplastic elastomer product could be molded into films at 210° C. and had a tensile strength at break in excess of 1000 psi. A reference mixture of polyisoprene and homopolypivalolactone was sticky and unmoldable and had no strength.

EXAMPLE 2

Polypivalolactone-on-Polybutadiene Graft

Butyllithium (1.5 molar in hexane) was added dropwise to a stirred solution of 20 g (0.37 monomer mole) of polybutadiene, 196,000 $M_n$, of high 1,4-cis structure in 500 ml of hexane until a faint yellow color persisted. This was to insure that acidic impurities were neutralized. Additional butyllithium (0.3 ml: 4.5 × $10^{-4}$ mole) was then blended into the solution, followed immediately by addition of 0.4 ml (3.3 × $10^{-3}$ mole) of TMEDA. The viscous yellow solution was stirred and heated to 50° C. for 1 hour, after which 3.0 ml (about 3 × $10^{-2}$ mole) of PVL was added. The yellow color immediately disappeared and the reaction mixture became very viscous. The mixture was allowed to cool to room temperature and stirring was discontinued. After standing overnight, the mixture was added to an excess of ethanol containing a small amount of N-phenyl-$\beta$-naphthylamine antioxidant. The precipitate containing polypivalolactone-on-polybutadiene graft was separated by filtration, suspended in water and subjected to steam distillation to remove residual ethanol. It was finally separated and dried under vacuum. IR indicated the presence of polymerized pivalolactone. The graft could be pressed into films at 210° C having a tensile strength greater than 1000 psi and an elongation of about 1000%. A physical mixture of polybutadiene and polypivalolactone exhibited no useful thermoplastic or elastomeric properties.

EXAMPLE 3

Polypivalolactone-on-Styrene/Butadiene Copolymer Graft

A sample of raw styrene/butadiene elastomer (SBR), 97,000 $M_n$, was cleaned by dissolving it in benzene and adding an excess of ethanol to the stirred solution in a blender. The precipitated polymer was additionally washed in the blender, twice with acetone and once again with ethanol, after which it was dried under vacuum.

A solution of 20 g of the clean dry SBR in 200 ml of benzene was treated with 1.5 molar butyllithium in hexane until a faint yellow color persisted. An additional 2.5 ml (3.25 × $10^{-3}$ mole) of butyllithium was added with stirring, and then 0.7 ml (5.8 × $10^{-3}$ mole) of TMEDA was introduced. The resulting mixture was heated to 50° C. and held there for 1 hour, during which time the viscosity increased significantly and a deep yellow-orange color developed. Finally, 6.0 ml (about 6 × $10^{-2}$ mole) of PVL was added; and within a few minutes the color had disappeared, the viscosity had increased, and the reaction with PVL was complete as indicated by successive infrared analyses of the product. The reaction mixture was cooled to room temperature and stored without stirring overnight. A small amount of N-phenyl-$\beta$-napthylamine antioxidant dissolved in benzene was added, and the mixture was then exhaustively steam distilled to remove solvents. The precipitated product was finally washed with alcohol, separated by filtration and dried overnight under vacuum. The dry product contained polypivalolactone-on-SBR graft polymer. IR showed essentially complete incorporation of PVL. Contrasting to a physical mixture of SBR and polypivalolactone which had no useful properties and which could not even be molded, the thermoplastic elastomer graft was pressed into film at 210° C. having a tensile strength in excess of 2,000 psi and an elongation at break of about 1100%.

EXAMPLE 4

Graft of Polypivalolactone-on-Carboxylated Ethylene/Propylene/1,4-Hexadiene Terpolymer A. Carboxylation An ethylene/propylene/1,4-hexadiene, 55:40:5 weight percent, terpolymer containing 0.61 double bond mole of ethylenic unsaturation per kg, $M_n$ of above 2,000, and displaying a Mooney viscosity(ML-4/121° C) of 35 and a $T_g$ of −55° C was dissolved in hydrocarbon solvent and reprecipitated in acetone to remove antioxidant. A solution of 23.8 g (1.43 × $10^{-2}$ double bond mole) of the purified copolymer in 500 ml of benzene containing 50 ml of tetrahydrofuran was prepared, and then 11.0 g (1.2 ×$10^{-1}$-SH mole) of mercaptoacetic acid and 0.6 g azobis(isobutyronitrile) free radical initiator were added with stirring. The reaction mixture was stirred and heated at 70° C. for 16 hours. The carboxylated product was precipitated by addition of excess methanol to the reaction mixture in a blender at room temperature; it was redissolved in benzene, precipitated a second time by addition of acetone and dried.

The recovered carboxylated terpolymer weighed 21.4 grams and was essentially odorless, indicating complete removal of unreacted mercaptoacetic acid.

Infrared analysis showed a large carbonyl absorption at 5.9μ, indicating the presence of carboxyl groups. Infrared analysis for unsaturation indicated that about ⅔ of the original unsaturation had become saturated, and the polymer contained 0.4 carboxyl moles per kg.

B. Making the Graft

A sample (10.0 g; 4.0 × 10⁻³ carboxyl mole) of the carboxylated terpolymer of Part A was dissolved in 200 ml of benzene containing 40 ml of tetrahydrofuran. To this solution was added 3.24 ml (2.5 × 10⁻³ mole) of a 0.772 molar solution of tetrabutylammonium hydroxide in methanol. The mixture was stirred and heated to 60° C., and then 3.75 g (3.75 × 10⁻² mole) of PVL was added. An immediate exothermic reaction caused vigorous boiling of the solvent. The mixture was heated at reflux, 73° C., for 2 hours, cooled to room temperature, and acidified with 0.5 ml (6 × 10⁻³ mole) of concentrated hydrochloric acid. The product was isolated by precipitation in methanol, then boiled in methanol, and finally dried overnight at 60° C. under vacuum. The dried graft copolymer weighed 12.4 g and contained 7.68% oxygen, the analysis indicating a PVL content of 20.8% by weight. By calorimetric analysis the product had a crystalline melting range of about 164° to 168° C.

The product contained polypivalolactone-on-carboxylated ethylene/propylene/1,4-hexadiene terpolymer graft. The product comprised multiple "hard" (polypivalolactone) segments (side-chains) attached to "soft" base terpolymer segments. The determination of the hard and soft segment values for the product of this Example can be seen from the relative amounts of carboxylated terpolymer and pivalolactone used in its preparation, as calculated below:

$$\frac{1000 \text{ g/kg}}{0.4 \text{ moles of CO}_2\text{H/Kg}} = 2500 \text{ g/mole soft segment value}$$

$$\frac{0.0375 \text{ moles of PVL} \times 100 \text{ g/mole of PVL}}{0.004 \text{ mole of CO}_2\text{H}} = 940 \text{ g/mole hard segment value}$$

The graft polymer was elastomeric and could be molded and remolded into thin slabs at 180° C. The molded specimens were clear, highly elastic, exhibited excellent resistance to water, methanol, and acetone and were only slightly swollen by benzene and hexane. Physical test data are shown in the first column of the following table.

Additional graft compositions prepared by methods similar to that described above were molded into slabs of 50 mil thickness, and tensile data were obtained at 25° C. on test strips ¼ inches wide. The tensile and other physical data are presented in the second and third columns of the following table.

TABLE

|  | Graft Compositions | | |
|---|---|---|---|
| Soft Segment value, g/mol | 2500 | 2500 | 4400 |
| Hard segment value, g/mole | 940 | 550 | 970 |
| Physical Determinations | Physical Data | | |
| Modulus at 100% elongation, psi | 850 | 600 | 440 |
| Modulus at 300% elongation, psi | 1450 | 1290 | 975 |
| Tensile at break, lb/in² | 3150 | 2050 | 2400 |
| Elongation at break, % | 680 | 540 | 680 |
| Permanent set at break, % | 73 | 36 | 62 |
| Compression set, 22 hrs/70°, % | 42 | 50 | — |
| Shore "A" hardness | 78 | 74 | — |

To demonstrate how the product of this example is internally reinforced by the crystallized polypivalolactone graft segments, the following experiment was carried out: A base polymer similar to that described in part A of this Example for the preparation of carboxylated polymer, i.e., the ethylene/propylene/1,4-hexadiene terpolymer containing 0.61 double bond mole per kg., was compounded according to the recipes shown in the following table on a standard rubber mill. These stocks were then vulcanized into 50 mil slabs in closed molds at 160° C. under pressure for one-half hour and tensile properties measured. The data clearly show that the non-reinforced rubber stock has very low tensile strength and that carbon black reinforcement gives high tensile strength. Comparison with the data in the Table above for the polyester graft copolymer shows that this polymer has tensile properties fully equivalent to or better than the non-grafted, sulfur-vulcanized, carbon black-reinforced base polymer, (B, below).

RECIPES

|  | A | B |
|---|---|---|
| ethylene/propylene/1,4-hexadiene copolymer | 100 | 100 |
| stearic acid, phr (parts/hundred parts rubber) | 1 | 1 |
| zinc oxide, phr | 5 | 5 |
| carbon black, phr | — | 50 |
| sulfur, phr | 1.5 | 1.5 |
| tetramethyl thiuram disulfide, phr | 0.5 | 0.5 |
| 2,2'-dithiobis (benzothiazole), phr | 1 | 1 |
|  | 109 | 159 |
| Modulus at 100% elongation, psi, 25° C. | 110 | 400 |
| Modulus at 300% elongation, psi, 25° C. | — | 1370 |
| Tensile at break, psi, 25° C. | 140 | 2540 |
| Elongation at break, %, 25° C. | 190 | 290 |

EXAMPLE 5

Polypivalolactone-on-Ethylene/Ethyl Acrylate/Maleic Anhydride Terpolymer Graft

The base polymer was a soft ethylene/ethyl acrylate/maleic anhydride terpolymer, $M_n$ above 2,000, with a composition by weight of 21% ethylene, 77% ethyl acrylate and 2.0% maleic anhydride. It had a Wallace Plasticity of 9, an inherent viscosity of 1.90 at 30° C. in chloroform and a glass transition temperature of −34° C. Its maleic anhydride content provided a carboxyl content of about 0.28 mole per kg.

A solution of 50 g (1.4 × 10⁻² mole) of the terpolymer in 1250 ml of tetrahydrofuran was stirred and mixed with 13 ml (1.0 × 10⁻² mole) of a 0.766 molar solution of tetra-n-butylammonium hydroxide in methanol. The stirred mixture was heated to reflux, 65° C., and 15.1 ml (about 1.5 × 10⁻⁶ mole) of PVL was added. An immediate exothermic reaction caused more rapid boiling of the solvent. The reaction mixture was heated at reflux for 1 hour, the heating was discontinued, and as the mixture cooled 2 ml (2.4 × 10⁻² mole) of 12 molar hydrochloric acid was added. After the reaction mixture reached room temperature it was poured into an excess of water and the precipitated polymer was isolated. The product was washed twice with methanol and then dried under vacuum.

The dried product was elastomeric and exhibited excellent resistance to water, methanol, acetone and aliphatic hydrocarbon solvents and was only slightly swollen by benzene, carbon tetrachloride and tetrahydrofuran. The product contained polypivalolactone-on-ethylene/ethyl acrylate/maleic anhydride graft.

The product containing the novel graft composition was readily moldable and remoldable at 185° C and 4000 psi to give colorless, transparent rubbery articles. It gave the following physical test data.

| Tensile strength at 25° C | 2900 psi |
|---|---|
| Elongation at break | 700% |
| Compression set (22 hrs/70° C) | 45% |
| Compression set (70 hrs/100° C) | 60% |
| Hardness (Shore A) | 89 |

EXAMPLE 6

Polypivalolactone-on-Chlorinated Ethylene/Methacrylic Acid Copolymer Graft

An ethylene/methacrylic acid copolymer having a melt index of 8 and containing 1.7% by weight of methacrylic acid was chlorinated until it contained 30% by weight of chlorine. The chlorinated copolymer was elastomeric and had a glass transition temperature of −25° C. It was calculated to contain 1.2% by weight of methacrylic acid, or 0.14 mole of carboxyl per kg.

Following the procedure of Example 5, 50 g ($7.0 \times 10^{-3}$ mole) of the chlorinated ethylene/methacrylic acid copolymer, ($M_n$ above 2,000), 6.5 ml ($5 \times 10^{-3}$ mole) of 0.772 molar tetra-n-butylammonium hydroxide in methanol and 10.0 ml (about $1.0 \times 10^{-1}$ mole) of PVL were interacted and the product was isolated.

The elastomeric product contained polypivalolactone-on-chlorinated ethylene/methacrylic acid copolymer. It had excellent resistance to water, methanol, acetone and aliphatic hydrocarbon solvents and was slightly swollen by benzene, carbon tetrachloride and tetrahydrofuran. From the proportion of the reactants, a soft segment value of 7,200 and a hard segment value of 1,400 were calculated. It was readily moldable and remoldable at 185° C. and 400 psi to form transparent rubbery articles. Test samples showed the following physical properties:

| Tensile strength at 25° C | 800 psi |
|---|---|
| Elongation at break | 520% |
| Compression set (22 hrs/70° C) | 59% |
| Hardness (Shore A) | 85 |

EXAMPLE 7

Polypivalolactone-on-Polydimethylsiloxane Graft

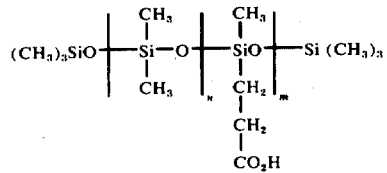

One hundred grams of the viscous silicone resin of the above structure, (in which m = about 5% and n = about 95% of the polymer weight), containing 5% of the acid residue, with an average molecular weight of 10,000 and about 7 carboxyl groups per chain (soft segment value of 1500), was dissolved in 400 cc. of tetrahyrofuran and 17.6 cc. (14.4 g., $1.4 \times 10^{-2}$ mole) of a 25% solution of tetrabutyl ammonium hydroxide in methanol was added. Pivalolactone (75 g., $7.5 \times 10^{-1}$ mole ) was then added slowly, after which the solution was significantly higher in viscosity and very slightly cloudy. Four drops of sulfuric acid was then added and the polymer precipitated in water.

The white solid obtained (141 g.) contained polypivalolactone grafted onto the silicone base polymer, and showed a minimum flow temperature of 170° C. and contained 18.4% silicon. Since the original liquid resin contained 35% silicone, the pivalolactone content of this graft copolymer was estimated as 50%. Between crossed polaroids under the microscope, the product showed extensive spherulite development.

EXAMPLE 8

Polypivalolactone-on-Ethylene/Ethyl Acrylate Copolymer Graft

An autoclave was loaded with 3000 ml of $CH_2Cl_2$, 350 ml of ethyl acrylate, and 2 ml of benzoyl peroxide. After the resulting mixture had been saturated with $BF_3$ (10 psig. for 7 minutes) while being cooled, the autoclave was evacuated, pressured with nitrogen, evacuated again, and pressured with ethylene to 250 psig. The temperature rose to 30° C. The pressure was then adjusted to 300 psig with ethylene. Within a few minutes an exothermic reaction raised the temperature from 30° to 39° C. After about 2.5 hours, the resulting alternating ethyl acrylate/ethylene copolymer product was isolated by steam stripping (which removed volatiles including $BF_3$ and solvent). The copolymer was then purified by agitation in a blender in an acetone/water mixture and dried in a vacuum oven at 85° C.; yield: 311 g. This product had a glass transition temperature of −38° C., an inherent viscosity of 2.82 (measured on a solution of 0.1 gram of copolymer in 100 milliliters of chloroform at 30° C.) a $M_n$ of about 150,000, a Wallace Plasticity of 30, and a Mooney viscosity (ML-4/100° C.) of 53; there were no free carboxyl groups.

A solution of 50 g of the copolymer in 1250 ml of tetrahydrofuran was stirred and mixed with 12.6 ml ($1.0 \times 10^{-2}$ mole) of a 0.796 molar solution of tetrabutylammonium hydroxide in methanol. The solution was brought to reflux and maintained there for 2 hours. At the end of that time 15.1 ml (about $1.5 \times 10^{-1}$ mole) of PVL was added to the solution. Refluxing was maintained for another hour. As the solution was cooling to room temperature, 2 ml ($2.4 \times 10^{-2}$ mole) of 12 molar hydrochloric acid was added. The acidified mixture was stirred into about 3 volumes of water, and the precipitated product was separated and washed with methanol.

The product contained polypivalolactone-on-ethylene/ethyl acrylate graft composition. It was a white, elastomeric polymer insoluble in tetrahydrofuran which, from the ratio of reactants, was calculated to have a soft segment value of about 5000 and a hard segment value of about 1500. It was readily moldable and remoldable at 196° C. and 4000 psi to give colorless, transparent rubbery articles. Test samples showed the following physical properties:

| Tensile strength at 25° C | 3170 psi |
|---|---|
| Elongation at break | 650% |
| Compression set (22hrs/70° C) | 41% |
| Hardness (Shore A) | 87 |
| Clash-Berg temperature | −24° C |

EXAMPLE 9

Polypivalolactone-on-Chloroprene/Methacrylic Acid Copolymer Graft

The soft backbone of 2-chloro-1,3-butadiene (chloroprene)/methacrylic acid copolymer contained 2.2–2.4% by weight of methacrylic acid or about 0.27 mole of carboxyl per kg. The copolymer was gel free and had a glass transition temperature well below 0° C.

Following the procedure of Example 5, 50 g (about $1.35 \times 10^{-2}$ mole) of the chloroprene/methacrylic acid copolymer, ($M_n$ above 2,000) 6.3 ml ($5 \times 10^{-3}$ mole) of 0.796 molar tetrabutylammonium hydroxide in methanol and 7.6 ml (about $7.5 \times 10^{-2}$ mole) of PVL were interacted and the graft copolymer isolated. The tan elastomeric product, containing polypivalolactone-on-chloroprene/methacrylic acid graft composition, had excellent resistance to water, methanol and aliphatic hydrocarbon solvents and was slightly swollen by tetrahydrofuran. From reactant ratios, the product was calculated to have a soft segment value of about 3,700 and a hard segment value of about 600. It was readily moldable and three remoldable at 166° C. and 4000 psi to form transparent rubbery articles. Test samples showed the following physical properties:

| | |
|---|---|
| Tensile strength at 25° C. | 1320 psi |
| Elongation at break | 815% |
| Compression set (22 hrs/70° C) | 60% |
| Shore A hardness | 77 |

EXAMPLE 10

Polypivalolactone-on-Ethylene/Methacrylic Acid Copolymer Graft

PVL was grafted onto a copolymer of ethylene and methacrylic acid (number average molecular weight, $M_n$, about 65,000) containing 1.7% combined methacrylic acid (5,000 soft segment value of about 13 carboxyls per chain).

The copolymer (200 g., $4.0 \times 10^{-2}$ carboxyl mole) was dissolved in 800 ml of xylene (< 0.02% water, $b$ 137°–140° C.) at 105°–110° C., then cooled to 85°–90° C. and 8.16 g ($6.3 \times 10^{-3}$ mole) of a 25% solution of tetrabutylammonium hydroxide in methanol was added. PVL (35 g, $3.5 \times 10^{-1}$ mole) was added slowly over a period of 45 min. and the reaction mixture stirred for an additional 45 min. at 85°–90° C. before precipitating the graft polymer in acetone in a high speed blender. The granular product was washed with acetone and dried for 16 hrs. at 80° C. and 18 in. vacuum. Yield of 235 g of dry copolymer represents a quantitative conversion of added PVL. Properties of the base copolymer and the product containing pivalolactone-on-ethylene/methacrylic acid graft composition are compared below:

| | Base Polymer | Graft Polymer Composition |
|---|---|---|
| PVL content (%) | — | 15 |
| Graft chain length (est.) | — | 9 |
| Minimum flow temp. (° C) | 103 | 167 |
| Mechanical properties | | |
| Yield stress (lb/in²) | 1405 | 1580 |
| Tenacity at break (lb/in²) | 1880 | 1640 |
| Elongation at break (%) | 518 | 285 |
| 100% Modulus (lb/in²) | 1465 | 1573 |

In this example the addition 15% pivalolactone as grafts with an estimated degree of polymerization of 9 (hard segment value of 900) has increased the minimum flow temperature by 64° C and significantly increased yield stress and modulus.

EXAMPLE 11

Polypivalolactone-on-Ethylene/Vinyl Acetate/Methacrylic Acid Terpolymer Graft An ethylene/vinyl acetate/methacrylic acid terpolymer (71/28/1, $M_n$ approx. 63,000) having a soft segment value of about 8400 (7.5 carboxyls per chain) was grafted with PVL at five levels by the following procedure.

The copolymer (200 g, $2.3 \times 10^{-2}$ carboxyl mole) was dissolved in 800 ml tetrahydrofuran at 85° C and 4.8 g ($3.7 \times 10^{-3}$ mole) of a 25% solution of tetrabutylammonium hydroxide in methanol was added. PVL (10.5 g., $1.05 \times 10^{-1}$ mole) was added over 20–25 min. and the stirred system held at 85° C. for an additional hour before precipitating the graft copolymer in water in a blender. The product was washed thoroughly with hot water, then dried in the vacuum oven at 80° C. and 18 in. vacuum for 20 hrs. Yield: 209.6 g. Four more preparations with the same amounts of terpolymer and base and 15 g., 22 g., 37.5 g. and 50 g, respectively of PVL were carried out. The five graft copolymers are calculated to contain 5, 7, 10, 15 and 19 percent, respectively, of PVL. Properties of the base copolymer and the product containing polypivalolactone-on-ethylene/vinyl acetate/methacrylic acid graft compositions are compared below.

| | Base Polymer | Graft Polymer Compositions | | | | |
|---|---|---|---|---|---|---|
| PVL content (%) | — | 5 | 7 | 10 | 15 | 19 |
| Graft chain length | — | 5 | 7 | 10 | 15 | 20 |
| Hard segment value | — | 500 | 700 | 1000 | 1500 | 2000 |
| Minimum flow temp. (° C) | 82 | 107 | 132 | 143 | 170 | 189 |
| Mechanical properties | | | | | | |
| Yield stress (lb/in²) | 307 | 330 | 340 | 450 | 583 | 787 |
| Tenacity at break (lb/in²) | 2500 | 2330 | 2540 | 2400 | 1920 | 2640 |
| Elongation at break (%) | 940 | 960 | 970 | 875 | 606 | 667 |
| Creep behavior at 70° C. and 7 lb/in² load | Parted in 50 min. | Parted in 60–75 min. | Intact after 19 hr. (10% elongation) | — | — | — |

Significant increase in minimum flow temperature and creep resistance at a graft degree of polymerization of 5 is further enhanced at a DP of 7. Note that stress-strain properties have not deteriorated. Microscopic examination at 25× of a melt-pressed film between crossed polaroid filters revealed marked spherulite development in the 7% graft with only minor differences between the 5% sample and the base resin.

Other β-Lactone Sidechain Derivatives

Lactones other than pivalolactone can be substituted in the process of this Example to produce graft products having desirable properties. One such desirable property is the extension of use temperature beyond that of the base polymer. For purposes of illustrating the predicted increase in the use temperature for grafts of lactones other than pivalolactone (over that of the base polymer), the Table below sets out the minimum flow temperature, MFT, of the base polymer, and the estimated minimum flow temperatures of grafts of other lactones to the base polymer. The figures are for grafts having an average DP of 10 and are expected to be accurate to within about ± 10° C.

TABLE

|  | Weight % Lactone | Est'd. MFT |
|---|---|---|
| Base Terpolymer | — | 82 (expt |
| α-methyl-α-ethyl-β-propiolactone | 12 | 94 |
| α,α-diethyl-β-propiolactone | 13 | 142 |
| α-methyl-α-n-propyl-β-propiolactone | 12 | 140 |
| α,α-di-n-propyl-β-propiolactone | 16 | 155 |
| α,α-diphenyl-β-propiolactone | 23 | 156 |
| α-methyl-α-chloromethyl-β-propiolactone | 14 | 149 |
| α,α-bis-chloromethyl-β-propiolactone | 17 | 173 |
| α,α-pentamethylene-β-propiolactone | 14 | 157 |
| copolymer of α,α-dimethyl-β-propiolactone and α,60 -di-n-propyl-β-propiolactone (in 1:1 ratio by weight) | 13 | 149 |

EXAMPLE 12

Graft of Polypivalolacetone of Ethylene/Propylene/Hexadiene-Maleic Anhydride Addition Product An ethylene/propylene/hexadiene copolymer similar to that of Example 4 containing 0.6 mole/kg unsaturation (200 g) was mixed on a 4 × 8 inches rubber mill with 10 g of powdered maleic anhydride at a mill temperature of 25° to 50° C. until the maleic anhydride was well dispersed in the polymer. A 100 g portion of the milled mixture was then heated in a 12 × 12 × ⅛ inches closed mold for 30 minutes in the temperature range 500° to 540° F. The molded slab was remilled at room temperature. Analysis of the ethylene/propylene/hexadiene-maleic anhydride addition product gave the following results: Wallace plasticity: 60, wt. % maleic anhydride: 2, wt. % oxygen: 1.26–1.15, total acidity, meq/gram: 0.29, hexane solubility (5 g/100 ml): 99%.

A sample (57.5 g; 1.67 × 10$^{-2}$ mole of carboxyl) of the addition product was dissolved in 1 liter of THF and to this solution was added 6.3 ml (5.0 × 10$^{-3}$ mole) of a 0.79 molar solution of tetrabutyl ammonium hydroxide in methanol. The mixture was stirred and heated to 60° C and then 17.0 g (0.17 mole) of PVL was added. The mixture was heated at 60° C for 2 ¼ hours and then acidified with 1 ml (ca. 1.2 × 10$^{-2}$ mole) of concentrated hydrochloric acid while still hot. The product was isolated by precipitation in 2.5 l. of water and then boiled in methanol. Infrared analysis indicated that the dried product contained 19.5 wt. % polyPVL. By calorimetric analysis, the product has a crystalline melting point at 173° C.

The product was an elastomeric graft polymer readily moldable and remoldable at 200° C. Test samples exhibited the following physical properties:

| | |
|---|---|
| Modulus at 100% elongation, psi | 630 |
| Modulus at 300% elongation, psi | 1320 |
| Tensile strength at break, psi | 3500 |
| Elongation at break, % | 740 |
| Compression set, 22 hrs/70°, % | 36 |
| Shore A Hardness | 77 |

EXAMPLE 13

Pivalolactone Graft Onto Poly-N-vinylcarbazole

A 5 wt. % solution of poly-N-vinylcarbazole in anhydrous THF under argon was treated with N-butyllithium (0.32 m mole/g of polymer) at 25° for 5 min. The resulting yellow-green solution was cooled to −78° C. and pivalolactone added (0.8 g/g of polymer). This solution was warmed slowly to 40° during which time the viscosity increased and the solution became cloudy. After heating for 30 min. at 40° C. the gelled solution was precipitated in hexane and the solid product isolated by filtration. The product contained 25 wt. % of polypivalolactone and was characterized and predominantly a graft copolymer by thermal analysis (m.p. at 200°–210°) and extraction with solvents. The product was molded into stiff sheets at 230° C which were resistant to solvents.

EXAMPLES 14 and 15

Polypivalolactone-on-Poly(Ethylene/Isobutyl Acrylate/Methacrylic Acid) Grafts Ethylene/isobutyl acrylate/methacrylic acid terpolymer were grafted with PVL by the general procedure of Example 13. The data are presented in the following table:

| | Example 14 | | Example 15 | |
|---|---|---|---|---|
| | Base | Grafts | Base | Grafts |
| Ethylene (%) | 60.3 | — | — | 82.2 | — | — |
| Isobutyl Acrylate (%) | 38.0 | — | — | 17.4 | — | — |
| Methacrylic acid (%) | 1.7 | — | — | 0.41 | — | — |
| $M_n$ (approx.) | 75,000 | — | — | 80,000 | — | — |
| Carboxyls/base (est.) | 15 | — | — | 3.8 | — | — |
| Soft segment value | — | 5000 | 5000 | — | 2100 | 2100 |
| PVL (wt. % calc.) | — | 10 | 20 | — | 10 | 16 |
| PVL (Graft DP, calc.) | — | 6 | 13 | — | 23 | 42 |
| Hard segment value | — | 600 | 1300 | — | 2300 | 4200 |
| Min. flow temp (° C) | 96 | 124 | 168 | 106 | 192 | 200 |
| Yield stress (lb/in²) | 202 | 227 | 648 | 604 | 830 | 950 |
| Break tenacity (lb/in²) | 856 | 883 | 1340 | 2340 | 2400 | 2360 |
| Break elong. (%) | 948 | 966 | 540 | 750 | 630 | 58 |
| Initial Modulus | 742 | 1410 | 6500 | 804 | — | — |
| 100% modulus | — | — | — | — | 1050 | 1140 |

These data show the same kind of property enhancement for the polypivalolactone-on-ethylene/isobutyl acrylate/methacrylic acid grafts as seen in the ethylene/vinyl acetate systems described in these Examples.

EXAMPLE 16

Polypivalolactone-on-Ethylene/Vinyl Acetate/acrylic Acid Terpolymer Graft

An ethylene/vinyl acetate/acrylic acid (30/66/4) terpolymer, having an estimated soft segment value of 1800, was grafted with PVL by the general procedure of Example 11.

| | Base Polymer | Graft Polymer |
|---|---|---|
| PVL content (%) | — | 26 |
| Graft chain length | — | 6.2 |
| Hard segment value | — | 620 |
| Minimum flow temp. (° C) | 42 | 198 |

EXAMPLES 17–27

Polypivalolactone-on-Poly (Ethylene/Vinyl Acetate/Methacrylic Acid) Grafts

Ethylene/vinyl acetate/methacrylic acid terpolymers were grafted with PVL by the general procedure of Example 11. The data are presented in the following Table.

TABLE (Examples 17 – 27)

Polypivalolacetone-on-poly (ethylene/vinyl acetate/methacrylic acid) Grafts

E = ethylene; VAc = vinyl acetate; MAA = methacrylic acid; $CO_2H$ sites = number of carboxyl groups per polymer molecule; $M_n$ = number average molecular weight; PVL = pivalolactone; DP = degree of polymerization; MFT = minimum flow temperature; Yield stress - stress in lb/in.$^2$ at yield point in draw; Break Tenacity = tenacity in lb/in.$^2$ at break point in draw; Break elong = % elongation at break point in draw; Initial modulus = modulus at start of draw; 100% modulus = modulus at 100% elongation in draw.

| | Base Polymer | | | | | Physical Properties | | | | | | |
|---|---|---|---|---|---|---|---|---|---|---|---|---|
| Ex. | % E/ | % VAc | /% MAA | $CO_2H$ Sites/ Soft Segment Value | $M_n$ | % PVL | Graft DP | Hard Segment Value | MFT °C | Yield Stress | Break Tenacity | Break Elong. | Initial Modulus | 100% Modulus |
| 17 | 61.3/ | 37.3/ | 1.4 | 6/6100 | 36,600 | — | — | — | 67 | 117 | 742 | 1110 | 315 | — |
| | | | | | | 5 | 3 | 300 | 69 | 131 | 720 | 1480 | 323 | — |
| | | | | | | 10 | 6.3 | 630 | 107 | 202 | 833 | 1225 | 820 | — |
| | | | | | | 12 | 7.8 | 780 | 114 | 266 | 866 | 1013 | — | — |
| | | | | | | 15 | 10 | 1000 | 130 | 344 | 1060 | 692 | 2950 | — |
| | | | | | | 17 | 13 | 1300 | 170 | 615 | 1586 | 603 | — | — |
| | | | | | | 20 | 14.3 | 1430 | 165 | 510 | 1370 | 500 | 4600 | — |
| | | | | | | 53 | 64 | 6400 | 217 | 1600 | 3460 | 423 | — | — |
| 18 | 66.0/ | 29.4/ | 4.6 | 15/1900 | 28,000 | — | — | — | — | 275 | 1040 | 840 | 1140 | — |
| | | | | | | 7 | 1.4 | 140 | — | 231 | 778 | 940 | 707 | — |
| | | | | | | 10 | 2.1 | 210 | — | 236 | 676 | 1000 | 916 | — |
| | | | | | | 20 | 4.7 | 470 | — | 445 | 905 | 724 | 3621 | — |
| | | | | | | 35 | 10 | 1000 | — | 1276 | 1720 | 190 | 17000 | — |
| 19 | 70.9/ | 28.4/ | 0.7 | 4.2/12,200 | 51,500 | — | — | — | 90 | 385 | 2530 | 950 | 2140 | — |
| | | | | | | 10 | 13.5 | 1350 | 162 | 511 | 2745 | 850 | 5400 | — |
| | | | | | | 15 | 22 | 2200 | 184 | 647 | 2823 | 700 | 5080 | — |
| 20 | 71.4/ | 27.4/ | 1.5 | 4.2/5700 | 24,000 | — | — | — | 70 | 277 | 675 | 840 | 1000 | — |
| | | | | | | 10 | 9.5 | 950 | 112 | 352 | 695 | 705 | 2500 | — |
| | | | | | | 15 | 15 | 1500 | 143 | 595 | 1046 | 455 | 6300 | — |
| | | | | | | 22 | 25 | 2500 | 170 | 870 | 1280 | 260 | 8700 | — |
| 21 | 73.5/ | 25.0 | 1.5 | 2.3/ 5700 | 13,200 | — | — | — | 67 | 253 | 400 | 735 | — | 273 |
| | | | | | | 10 | 6.3 | 630 | 154 | 512 | 606 | 222 | — | 561 |
| | | | | | | 18 | 12.5 | 1250 | 191 | 633 | 765 | 167 | — | 713 |
| 22 | 74.63/ | 25.0/ | 0.37 | 3.5/ 23000 | 81,000 | — | — | — | 98 | 412 | 3205 | 915 | — | 540 |
| | | | | | | 9 | 23 | 2300 | 190 | 653 | 3750 | 810 | — | 813 |
| | | | | | | 9.5 | 24 | 2400 | 188 | 637 | 4043 | 814 | — | 842 |
| 23 | 74.7/ | 25.1/ | 0.22 | 2.1/ 40,000 | 82,000 | — | — | — | 96 | 500 | 3413 | 865 | — | — |
| | | | | | | 5 | 22 | 2200 | 174 | 630 | 3675 | 809 | 4655 | — |
| | | | | | | 7.5 | 31 | 3100 | 186 | 555 | 3640 | 860 | 6450 | — |
| | | | | | | 10 | 44 | 4400 | 202 | 688 | 3850 | 821 | 10460 | — |
| | | | | | | 14 | 63 | 6300 | 214 | 555 | 3520 | 795 | — | — |
| | | | | | | 16 | 78 | 7800 | 218 | 570 | 3500 | 762 | — | — |
| | | | | | | 47 | 340 | 34000 | 237 | — | — | — | — | — |
| 24 | 79.0/ | 20.0/ | 1.0 | 15/ 8600 | 129,000 | — | — | — | 121 | 692 | 3550 | 930 | 4500 | — |
| | | | | | | 10 | 9.5 | 950 | 127 | 523 | 2277 | 807 | 3854 | — |
| | | | | | | 15 | 15 | 1500 | 170 | 854 | 3470 | 674 | 11300 | — |
| | | | | | | 23 | 23 | 2300 | 192 | 1030 | 3560 | 670 | — | 1156 |
| | | | | | | 25 | 25 | 2500 | 192 | 5910 | 19300 | 680 | — | 7060 |
| 25 | 86.1/ | 11.5/ | 2.4 | 20/ 3600 | 72,000 | — | — | — | 106 | 605 | 2470 | 750 | — | 880 |
| | | | | | | 7 | 2.7 | 270 | 111 | 585 | 3010 | 822 | — | 810 |
| | | | | | | 15 | 6.3 | 630 | 145 | 860 | 2540 | 744 | — | 950 |
| | | | | | | 25 | 12 | 1200 | 174 | 1430 | 2510 | 494 | — | 1490 |
| 26 | 71.9/ | 27.9/ | 0.16 | 1.2/ 54,000 | 65,000 | — | — | — | 88 | 336 | 2776 | 946 | 2155 | — |
| | | | | | | 7 | 43 | 4300 | 198 | 508 | 3008 | 840 | 5430 | — |
| 27 | 74.0/ | 25.0/ | 1.0 | 1.2/ 8,600 | 10,300 | — | — | — | 67 | 259 | 322 | 526 | 970 | — |
| | | | | | | 5 | 4.7 | 470 | 72 | 233 | 280 | 397 | 980 | — |
| | | | | | | 10 | 9.5 | 950 | 122 | 487 | 522 | 102 | 5800 | — |
| | | | | | | 15 | 16 | 1600 | — | 625 | 652 | 74 | 8800 | — |
| | | | | | | 20 | 21.5 | 2150 | 182 | — | 823 | 62 | 5150 | — |

EXAMPLE 28

Graft Copolymerization in the Melt

An ethylene/vinyl acetate/methacrylic acid (74/25/1) terpolymer ($M_n$ about 65,000) having a soft segment value of 8,700 with about 7.5 carboxyls per chain was mixed in a 28 mm. Werner-Pfleiderer extruder, adjusted for a barrel temperature of 170° C. and a throughput time of about 60 sec., with 2.5 g (2.4 × 10$^{-3}$ mole) of a 25% solution of tetrabutylammonium hydroxide in methanol for each 100 g (1.2 × 10$^{-2}$ moles of carboxyl) of polymer blend. The resulting partly basified polymer was cut into beads and again fed through the extruder with no change in adjustment, but with the addition of pivalolactone at the levels indicated below. Graft polymerization was accomplished in the melt in the absence of solvents.

| Pivalolactone | | | Graft Product | |
|---|---|---|---|---|
| Rate of Addition (g./100 g base) | Mole | MFT | Yield Stress | Initial Modulus |
| — | — | 90 | 430 | 2800 |
| 10 | 1.0 × 10$^{-1}$ | 134 | 380 | 3000 |
| 15 | 1.5 × 10$^{-1}$ | 142 | 483 | 4700 |
| 25 | 2.5 × 10$^{-1}$ | 176 | 736 | 7800 |

EXAMPLE 29

Polypivalolactone-on-Ethylene/Dimethylaminoethyl Methacrylate Copolymer Graft

200 Grams of an ethylene/dimethylaminoethyl methacrylate (70/30) copolymer (molecular weight between about 5,000 to 50,000) was melted and degassed under vacuum at 175° C. Then, with an atmosphere of nitrogen, 40 g (4.0 × 10$^{-1}$ mole) of PVL was mixed dropwise into the stirred molten polymer over a period of 30 min. The temperature of the bath was increased to 180° then to 185° C during the addition. After a final degassing, the molten polymer was poured out onto a Teflon sheet to cool.

Extraction studies proved the formation of polypivalolactone-on-ethylene/dimethylaminoethyl methacrylate graft. Extraction of the starting material with refluxing cyclohexane for five hours in a Soxhlet extractor dissolved 97%. In contrast, a similar extraction of the graft polymer product dissolved only 43.3%. This is a clear indication that the product contained covalently bonded polypivalolactone and was not a mere mixture of base polymer and homopolypivalolactone.

Differential scanning calorimetry of the polypivalolactone-on-ethylene/dimethylaminoethyl methacrylate graft revealed the presence of endotherms at 29°, 59° and 84° C, characteristic of the base polymer, and a small endotherm at 132° and a larger one at 225° C attributable to pivalolactone structures. This example describes providing anionic sites to a base polymer which lacks substituent anionic sites through initial reaction with one mole of a lactone. The sites thus provided then act as attachment points for polyactone sidechains.

Initiation of the pivalolactone grafts in this Example involves of carboxylate anions by the reaction illustrated by Wilson and Beaman, J. Polymer Sci. Part A-1, 8, 2161-2170 (1970).

Stress-strain properties also indicate the change in structure:

| | Tensile strength at break psi | Elongation at break % | Initial Modulus psi |
|---|---|---|---|
| Base copolymer | 460 | 196 | 2550 |
| Graft copolymer | 448 | 34 | 5000 |

In a manner analogous to that of the tertiary amine in this Example, triarylphosphine groups, for example, triphenylphosphine groups would be effective initiators especially at higher temperatures.

EXAMPLE 30

Properties of the Novel Graft Copolymers

This Example describes some properties of pivalolactone on ethylene/vinyl acetate/methacrylic acid graft copolymers at 100° C.

The polymers of particular compositions as listed below were prepared according to the general procedure of Example 11. After drying, the products were pressed into 50 mil films in a Carver press (5,000 psi for 22 ½ min., then quenched to 30°–40° C). Tensile strips were tested in an Instron in a chamber maintained at 100° C. The properties show useful mechanical behavior at conditions under which the base resins would normally be fluid.

| Base Polymer | | | Graft Product | | |
|---|---|---|---|---|---|
| Composition | MFT, °C | % PVL | PVL DP | MFT, °C | Tenacity at break at 100° C | Elongation at break at 100° C |
| 65/29.4/4.6 | 75 | 35 | 10 | 185 | 295 | 10 |
| 61.5/37/1.5 | 67 | 20 | 14 | 170 | 178 | 15 |
| 72/27/1 | 60 | 22 | 25 | 170 | 178 | 12 |
| 74/25/1 | 67 | 20 | 22 | 182 | 119 | 7 |

EXAMPLE 31

Pivalolactone-on-Methyl Methacrylate/Ethyl Acrylate Copolymer Graft

To a solution of 5 g of a copolymer of MMA with 4.5% ethyl acrylate (Inherent Viscosity, I.V., of 0.445 determined in CHCl$_3$ at 20° C) in 70 ml of dry THF in a dried erlenmeyer flask with a magnetic stirrer, condenser and heating bath under N$_2$ was added 0.4 ml of 1M tetrabutylammonium hydroxide in methanol (calc. for an average of 4 moles of base per base polymer molecule). The solution was stirred at 60° for 1 hour, 0.5 ml of pivalolacetone was added and stirred at 60° for 2 hours. The cloudy solution was precipitated into hexane and the product filtered from solution and dried. The yield of product, 5.39 g., is equivalent to 84% conversion of the pivalolacetone. Absence of homopolypivalolactone was shown by the complete solubility of the graft copolymer in chloroform.

Other products were prepared by identical procedures; all can be compression molded into colorless, transparent bars at 200°–220° C. DTA analysis shows T$_g$'s of the base MMA resin (about 100° C) and melting points of the grafted PVL segments at 195° to 205° C. Data on composition and properties are in the accompanying table. By comparison, molded samples from a blend of the base MMA resin ($\overline{M}_n$ about 80,000) and 10 wt. % of polyPVL (DP=200) were opaque, weak, brittle and had a flexural modulus at room temperature of about 20% lower than the base MMA resin. Blends containing 10 to 30 weight percent of PVL polymer of DP=50 could not even be molded into bars of sufficient strength and toughness to be tested.

RANDOM GRAFT POLYMERS OF PIVALOLCTONE-ON-METHYL
METHACRYLATE/ETHYL ACRYLATE COPOLYMER

| Base Polymer | I.V. | Wt. % PVL in Graft | Calculated Average (Based on Mn of Base Polymer) | | Change in Flex. Modulus From that of Base Polymer |
|---|---|---|---|---|---|
| | | | Grafts/Base Polymer Molecule | DP of Graft | |
| 95.5 MMA/4.5 EA | 0.445 | 16% | 4 | 25 | +43,000 PSI |
| | 0.445 | 7.2 | 4 | 10 | −67,000* |
| | 0.445 | 7.2 | 4 | 10 | +16,000 |
| | 0.445 | 7.2 | 8 | 5 | +57,000 |
| | 0.575 | 12.6 | 6 | 18 | +86,000 |
| | 0.575 | 15.9 | 12 | 12 | +86,000 |
| | 0.760 | 8.3 | 4 | 25 | −67,000* |
| | 0.760 | 8.3 | 4 | 25 | +73,000 |

*Un-annealed samples all Others at 135–145°/16 hours.

EXAMPLE 32

Pivalolactone-on-Methylmethacrylate/Methacrylic Acid Copolymer Graft

Graft products were prepared by the general procedure in Example 31 where the base polymer was a 98.5% MMA/1.5% MAA copolymer (I.V. = 0.20) and the graft contained an average of 4 polypivalolactone sidechains per base polymer molecule with an average DP of 18. The graft copolymers could be molded into clear, colorless films at 200° C. Differential scanning calorimetry revealed an endotherm at 171°–177° C and IR spectra showed the presence of polymerized pivalolactone. The absence of homopolypivalolactone was confirmed by the complete solubility of the graft copolymer in chloroform.

The changes in the properties evidenced by the novel graft compositions over the properties of the individual graft components or blends thereof, are the result of the crystallization of the polyester sidechains in the graft molecule. Improved benefits are often gained through annealing or heat treatments (as simple as slower cooling rather then quenching) to improve the distribution and/or increase the frequency of the crystalline domains. Other methods for improving sidechain crystallinity are also within the contemplation of this invention.

EXAMPLE 33

Polypivalolactone-on-Ethylene/Ethyl Acrylate/Methacrylic Acid Terpolymer Graft The base polymer was a soft, random ethylene/ethyl acrylate/methacrylate acid terpolymer, $M_n$ above 2000, with a composition by weight of 51% ethylene, 45% ethyl acrylate and 3.8% methacrylate acid. It had a melt index of 0.3. Its methacrylic acid content provided a carboxyl value of 0.44 mole per kg.

Thirty grams of the base polymer (0.0132 mole methacrylic acid) was dissolved in 750 ml of tetrahydrofuran. The solution was heated to reflux and reacted with 3.5 ml of 1.015M tetramethylammonium hydroxide in methanol (0.00355 mole hydroxide). After 10 minutes, the solution was treated with 13.6 ml of pivalolactone (0.135 mole) and the mixture maintained at reflux for 1 hour. After 1 hour, 0.5 ml of 12M hydrochloric acid (0.006 mole) was added to the solution and the acidified mixture was stirred into an excess of water. The polymer crumbs were then separated, washed in boiling methanol, and dried.

The product was a white rubbery graft copolymer which was readily moldable and remoldable at 370° F to give colorless, transparent rubbery articles. These molded materials had the physical properties shown below:

| | |
|---|---|
| 100% Modulus (psi) | 1280 |
| Tensile Strength (psi) | 1730 |
| Elongation at Break (%) | 580 |
| Hardness (Shore A) | 88 |
| Compression Set "B" (22 hrs/70° C; %) | 38 |

When a soft random ethylene/methyl acrylate/ethyl hydrogen maleate terpolymer corresponding in composition and properties to the above-described ethylene/ethyl acrylate/methacrylic acid terpolymer is reacted with pivalolactone by the procedure of this example, a moldable elastomeric graft copolymer will be obtained. The molded materials from such a graft copolymer will have physical properties comparable to those given above.

EXAMPLE 34

Polypivalolactone-on-Polyisoprene Graft

Polyisoprene, 50,000 $M_n$, having a high content of cis-1,4-structure and lithiated ("living") carbanionic sites at both terminal ends of the polymer chain was prepared with DiLi-3 dilithiodianionic initiator (DiLi-3 is the trade name registered by Lithium Corporation of America for the commercial dilithio initiator made by addition of sec-butyllithium to m-divinylbenzene).

Into a dry 500-ml resin kettle fitted with a vibromixer stirrer and T-tube attached to a dry argon line was placed 300 ml of sodium-dried cyclohexane and 30 ml (20.4 g) of isoprene. The mixture was heated to 50° C and 0.9 ml of 0.9N DiLi-3 initiator was added. The reaction was allowed to proceed for 1.5 hours at 50° C, during which time most of the monomeric isoprene was consumed. Then, 1.0 ml of tetramethylethylenediamine (TMEDA) was added and the reaction allowed to proceed for an additional 30 minutes to insure complete consumption of residual monomeric isoprene.

To the above solution of living polyisoprene was added 1.6 ml of 1.27N sec-butyllithium to effect random lithiation of the polymer backbone. The metallation reaction was allowed to proceed for 2 hours, during which time the viscosity of the reaction mixture increased somewhat and the color change to amber. While the metallation was proceeding, a second dry reactor fitted with a mechanical stirrer was set up and into it under dry argon was placed 300 ml of sodium-dried tetrahydrofuran and 8.8 g of pivalolactone. The pivalolactone had been dried over calcium hydride and vacuum-distilled just prior to use. When the metallation was complete, the contents of the first reactor was transferred to the second reactor with vigorous stirring of the combined solutions. The transfer was effected by applying argon pressure to the first reactor and forcing its contents to move through glass tubing into the second reactor. The second reactor was cooled in an ice-methanol bath during the transfer. The amber color of the metallated polyisoprene solution faded immediately upon contact with the pivalolactone solution. On completion of the transfer, the ice bath was removed from the second reactor and the reaction mixture allowed to come to room temperature. The mixture became more viscous within five minutes, it turned cloudy within 15 minutes, and it set to a weak gel within 30 minutes. Stirring was halted and the mixture was allowed to stand overnight before work up. The polymer was isolated by drowning the reaction mixture in alcohol containing N-phenyl-β-naphthylamine antioxidant and acetic acid. The precipitated polymer was filtered and dried overnight in a vacuum oven under a slight purge of nitrogen.

The slightly tacky, chunky polymer was pressed into a film at 240° C and an elastomeric film was obtained. In contrast, polyisoprene of 50,000 molecular weight has essentially no film-forming strength and is extremely tacky. Infrared spectra of the polymer showed essentially quantitative incorporated of pivalolactone.

EXAMPLE 35

Polypivalolactone-on-Polyisoprene Graft

Polyisoprene, 90,000 $M_n$, having a high content of cis-1,4-structure and a lithiated (living) terminal carbanionic site at one end of the polymer chain was prepared with sec-butyllithium as the polymerization initiator. This living polymer was then randomly lithiated with additional sec-butyllithium to furnish a polylithiated polyisoprene substrate for polypivalolactone grafting.

In a reactor similar to that described for Example 34 was placed 350 ml of dry cyclohexane and 50 ml (34 g) of isoprene. The mixture was heated to 50° C and 0.3 ml of 1.27N sec-butyllithium was added. (This is the amount calculated to give polymer with 90,000 molecular weight). The reaction was allowed to proceed for 1.5 hours, after which 0.7 ml of tetramethylethylenediamine was added. The reaction was then allowed to proceed for an additional 20 minutes to insure complete consumption of monomeric isoprene. Finally, 1.5 ml of 1.27N sec-butyllithium was added to the reaction mixture and the reaction allowed to proceed for 2 hours to effect random metallation of the polymer backbone.

Meanwhile, a second reactor was charged with 300 ml of tetrahydrofuran and 11 g of pivalolactone (PVL). The mixture was cooled in an ice-methanol bath and then the contents of the first reactor was transferred into it by the technique described in Example 34. Within 2 minutes after transfer the mixture in the second reactor became a rather stiff gel. The polymer was precipitated in excess alcohol containing N-phenyl-β-naphthylamine antioxidant and acetic acid, and it was then filtered and vacuum-dried.

The final product was a porous crumbly material which could be pressed into elastomeric films at 240° C. The pressed films had significantly greater strength than those of Example 34. Infrared spectra showed complete incorporation of the PVL into the graft copolymer.

EXAMPLE 36

Polypivalolactone-on-Poly(ethyl acrylate) graft

A. Poly (ethyl acrylate) Preparation

A 1,000 ml flask was charged with 250 ml of distilled water, 108 ml of ethyl acrylate and 3 g of a surfactant (triethanolammonium salt of n-dodecyclphenylsulfonic acid). The mixture was stirred under nitrogen to form an emulsion, 0.2 g of sodium sulfite was added and the mixture was warmed to 60° C. on a steam bath. Polymerization was initiated by the addition of about 5 ml of a 5% aqueous solution of potassium persulfate. The temperature of the reaction mixture rose to 90° C. and was cooled over a period of about 15 minutes to 73° C. by the use of cold water and ice around the flask. The reaction mixture was allowed to stand at room temperature overnight. Methanol was then added to precipitate the product which was isolated by filtration and washed with water. Conversion was 95% to poly(ethyl acrylate).

B. Polypivalolactone-on-Poly(ethyl acrylate)

A 50 g portion of the poly(ethyl acrylate) from the reaction described above was dissolved in 1250 ml of acetone, heated to reflux, and stirred with 12.6 ml of a 0.79 molar solution of tetrabutylammonium hydroxide in methanol. After 30 minutes, 15.1 ml of pivalolactone was added. Refluxing was maintained for 1 hour. The reaction mixture was cooled to room temperature and acidified with 1 ml of concentrated aqueous hydrochloric acid. The acidified mixture was stirred into sufficient water to precipitate the product which was separated, washed with methanol and dried. The product contained 23 wt % of the pivalolactone. It was a white, elastomeric polymer insoluble in tetrahydrofuran, which from the ratio of reactants, was calculated to have a soft segment value of 5,000 and a hard segment value of 1,500. It was moldable at 365° F to give transparent rubbery articles. Test samples showed the following physical properties:

| | |
|---|---|
| Modulus at 100% elongation, psi, 25° C. | 1,030 |
| Tensile at break, lb/in², 25° C. | 1,000 |
| Elongation at break, %, 25° C. | 200 |
| Permanent set at break, %, 25° C. | 25 |
| Compression set, 22 hrs/70° C, % (annealed 20 hrs at 115° C.) | 37 |
| Shore A hardness | 90 |
| Bashore resilience | 14 |

UTILITY

The novel graft copolymers are moldable and extrudable and can be molded or extruded into useful articles by methods that will be obvious to those skilled in the art upon a reading of this disclosure. The uses for the self-supporting molded and/or extruded articles will likewise be obvious to those skilled in the art based upon the teaching herein. The following Examples are offered to illustrate some of the uses of the graft compositions.

EXAMPLE A

The dried polymer made by the procedure of Example 1 was pressed into slighly cloudy films at 210° C. and the films had good strength (in excess of 1000 psi), particularly after initial extension and relaxation. The films tended to cold draw during the first extension. A film sample retained its strength while extended for more than 20 minutes under hot water at 80° C. The films could be remolded for three to four cycles without significant permanent loss of elastomeric quality. The thermoplastic elastomeric nature of the product is in great contrast to that of a blend of the polyisoprene starting material and homopolypivalolactone, which was weak at room temperature, practically unmoldable in the raw state, and without any strength at 80° C. The thermal and flow properties indicate that the material can be injection molded or extruded into rubbery articles such as hose, gloves, pads, and the like, or may be melt spun into elastomeric fibers.

EXAMPLE B

Portions of the dried product made by the procedure of Example 2 were molded into films at about 210° C. The films were elastic, with a slight tendency to cold draw upon initial extension; and a stretched sample retained its strength when immersed in hot water. In contrast, the polybutadiene starting material had little elastic strength at room temperature and none at all in hot water. The films had high extensibility and can be used, inter alia, for wrapping irregularly shaped objects.

EXAMPLE C

Samples of the graft copolymer made by the procedure of Example 3 were pressed at 210° C. and gave highly extensible elastic films. Tensile strength of pressed films was found to be of the order of 140 kg/cm². In comparison, vulcanizates of raw SBR are known to have tensile strengths of only about 15 to 20 kg/cm². SBR vulcanizates containing toughening fillers have tensile strengths of about 170 to 200 kg/cm². Thus, is can be seen that the pivalolactone crystallites have the reinforcing effect of toughening fillers in addition to providing thermally reversible crosslinks.

EXAMPLE D

The graft copolymers of Example 17 with 15% and 20% pivalolactone are typical of a group of thermoplastic elastomers with useful strength properties, high elongation (500–700%) and modest initial moduli. With initial flow temperatures of 130°–170° C., they can be readily melt-extruded or molded into formed shapes for service as elastomeric extrusions or moldings.

Samples of the ethylene/vinyl acetate/methacrylic acid terpolymers of Example 17 containing 15% and 20% polypivalolactone grafted thereto were press (melt) spun into elastic filaments at 190° to 200° C. at speeds of 150 to 175 ft/min. The as-spun (undrawn) fibers were boiled off, conditioned, and cycled 5 times to the elongation indicated before testing. The fibers are suitable for making into clothing, such as ladies' foundation garments, in conventional ways. Physical properties for the fibers are as indicated below with standard definitions as set out in ASTM Section D-123.

|  | 15% PVL | 20% PVL |
|---|---|---|
| Denier | 70 | 56 |
| Cycled 5 times to (% of original length) | 300 | 180 |
| Breaking tenacity (g/denier) | 0.15 | 1.4 |
| Elongation at break (%) | 410 | 283 |
| Initial modulus (g/denier) | 0.016 | 0.03 |

-continued

|  | 15% PVL | 20% PVL |
|---|---|---|
| Permanent set (%) | 88 | 44 |

The embodiments of the invention in which an exclusive property or privilege is claimed are defined as follows:

1. A thermoplastic random organic graft copolymer formed by contacting
    an amorphous base polymer having at least one random carbanion site thereon
    with up to 150% by weight of the polymer, of at least one α-substituted-β-propiolactone in an amount such that the ratio of the moles of β-lactone to the moles of anionic sites on the base polymer varies between 3 to 1000, and
    polymerizing said β-lactone to form crystallizable polymer sidechains, said sidechains having a length of between 3 to 1000 monomer units and a weight of up to 60% of the graft composition,
    said base polymer being characterized in that it is amorphous to X-rays at a temperature of 130° C or below, and has a molecular weight of above 2,000.

2. A graft copolymer according to claim 1 wherein the sidechains consist essentially of pivalolactone homopolymer and have a length of between about 5 to 75 monomer units.

3. A graft copolymer according to claim 1 wherein the base polymer has carbanion sites selected from the group consisting of allylic and benzylic carbanion sites and the sidechains consist essentially of polypivalolactone.

4. A graft copolymer according to claim 3, wherein the base polymer has allylic carbanion sites.

5. A graft copolymer according to claim 4, wherein the base polymer is polyisoprene.

6. A graft copolymer according to claim 4, wherein the base polymer is polybutadiene.

7. A graft copolymer according to claim 4, wherein the base polymer is branched chain ethylene/propylene 1,4-hexadiene/nonconjugated diene tetrapolymer.

8. A graft copolymer according to claim 3, wherein the base polymer has benzylic carbanion sites.

9. A graft copolymer according to claim 8, wherein the base polymer is vinyl aromatic/alkadiene copolymer.

10. A graft copolymer according to claim 9, wherein the base polymer is styrene/butadiene copolymer.

11. A film of the copolymer of claim 1.

12. A fiber of the copolymer of claim 1.

13. A molded article of the copolymer of claim 1.

14. An extruded article of the copolymer of claim 1.

15. A process comprising contacting an amorphous base polymer having at least one random carbanion site thereon
    with up to 150% by weight of the base polymer, of at least one α-substituted-β-propiolactone in an amount such that the ratio of the moles of β-lactone to the moles of anionic sites on the base polymer varies between 3 to 1000 and
    polymerizing said β-lactone to form crystallizable polymer sidechains, said sidechains having a length of between 3 to 1,000 monomer units and a weight of up to about 60% of the graft composition,
    said base polymer being characterized in that it is amorphous to X-rays at a temperature of 130° C or below and has a molecular weight of above 2,000.

16. A process according to claim 15, comprising contacting base polymer and the β-lactone in the melt.

17. A process according to claim 16, carried out neat.

* * * * *